Feb. 4, 1958 D. W. KELBEL 2,821,869
PLANETARY GEARING
Filed Nov. 29, 1956
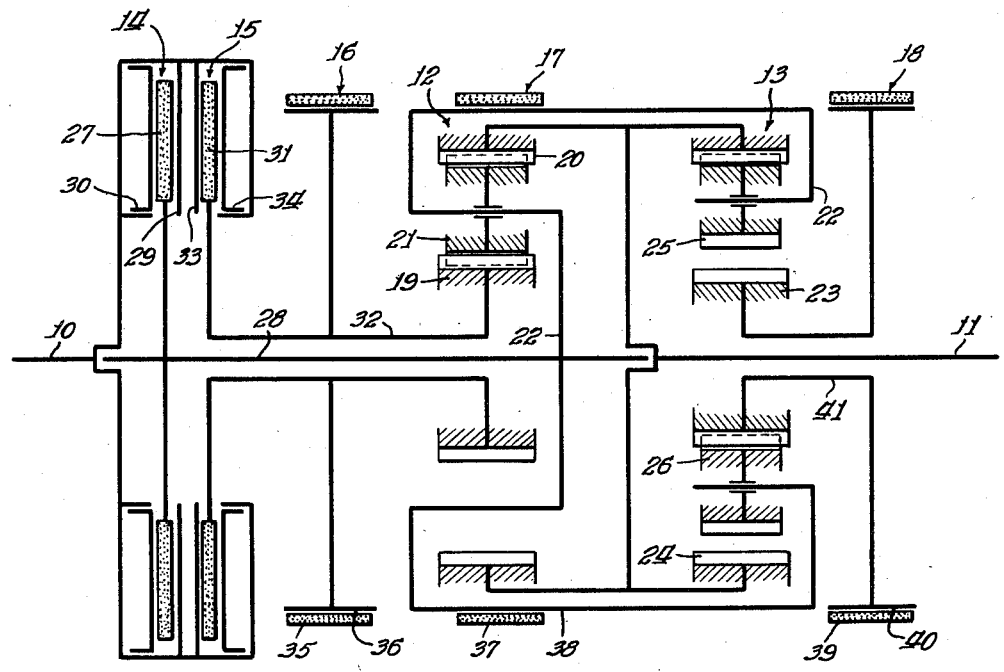
Inventor:
Donald W. Kelbel
By:
Keith J. Bleuer atty

United States Patent Office 2,821,869
Patented Feb. 4, 1958

2,821,869

PLANETARY GEARING

Donald W. Kelbel, Muncie, Ind., assignor to Borg-Warner Corporation, a corporation of Illinois Application November 29, 1956, Serial No. 625,104

5 Claims. (Cl. 74—763)

My invention relates to transmissions particularly adapted for use in automotive vehicles.

An object of the present invention is to inter-connect a simple planetary gear set and a dual planetary gear set so as to provide four forward speed drives and a drive in reverse between the drive shaft and the driven shaft.

Another object of this invention is to achieve these speed ratios by the use of a minimum number of friction clutches and brakes. Only two friction clutches and three friction brakes are needed in this system.

It is another object of this invention to complete any one of the desired ratios by engaging only two friction devices. In each of the different ratios, except direct drive, one clutch and one brake are engaged. In direct drive two clutches are engaged.

A further object of this invention is to provide a transmission in which it will be necessary to engage only one new friction device in shifting from one ratio to another while at the same time disengaging one friction device. It is contemplated that a very smooth operation will be possible by the use of only two friction devices to complete a desired speed ratio and engaging only one different friction device in up-shifting or down-shifting between the various ratios.

My invention consists of the novel constructions, arrangements and devices to be hereinafter described and claimed for carrying out the above stated objects and such other objects as will appear from the following description of a preferred form of the invention, illustrated with reference to the accompanying drawing which is a diagrammatic illustration of a transmission.

The illustrated transmission comprises a drive shaft 10 and a driven shaft 11. The drive shaft 10 is adapted to be driven by the engine (not shown) of the vehicle in which the transmission is installed, and the driven shaft 11 is adapted to drive the rear driving road wheels (not shown) of the vehicle through any suitable drive connections (not shown).

The transmission comprises, in general, a simple planetary gear set 12, a dual planetary gear set 13, two friction clutches 14 and 15 and three friction brakes 16, 17 and 18.

The planetary gear set 12 comprises a sun gear 19, a ring gear 20, a plurality of planet gears 21 in mesh with the sun gear 19 and the ring gear 20, and the planet gear carrier 22 for the planet gears 21. The dual planetary gear set 13 comprises a sun gear 23, a ring gear 24, a plurality of planet gears 25 in mesh with the ring gear 24, a plurality of planet gears 26 in mesh with the sun gear 23 and the planet gears 25, and the planet gear carrier 22 for the planet gears 25 and 26 which also carries the planet gears 21 of the planetary gear set 12. The ring gear 24 of the planetary gear set 13 is connected to the ring gear 20 of the planetary gear set 12. Both the ring gear 24 and the ring gear 20 are connected to the driven shaft 11.

The friction clutch 14 comprises a clutch disc 27 connected to the planet gear carrier 22 by means of an intermediate shaft 28. The clutch 14 also comprises the pressure plate 29 which is connected to the drive shaft 10 and further comprises a fluid pressure actuated piston 30 which grips the clutch disc 27 between the pressure plate 29 and the piston 30. The friction clutch 15 comprises a clutch disc 31 which is connected to the sun gear 19 by means of a quill shaft 32. The quill shaft 32 is rotatably disposed on the intermediate shaft 28. The clutch 15 also comprises a pressure plate 33 which is connected to the drive shaft 10 and further comprises a fluid pressure actuated piston 34 which grips the clutch disc 31 between the pressure plate 33 and the piston 34.

The brake 16 comprises a brake band 35 engageable on a brake drum 36. The brake drum 36 is connected to the quill shaft 32, the sun gear 19 and the clutch disc 31.

The brake 17 comprises a brake band 37 engageable on a brake drum 38. The brake drum 38 is an integral part of the gear carrier 22.

The brake 18 comprises a brake band 39 engageable on a brake drum 40. The brake drum 40 is connected to the sun gear 23 by means of a quill shaft 41. The quill shaft 41 is rotatably disposed on the driven shaft 11.

The brake bands 35, 37 and 39 may be engaged with their respective drums 36, 38 and 40 by any suitable means such as fluid pressure actuated servo-motors of any well known type (not shown).

The transmission provides a low, intermediate, direct and overdrive speed forward drives and a drive in reverse.

The transmission when the clutches 14 and 15 and the brakes 16, 17 and 18 are all disengaged is in a neutral condition, and the shaft 11 is not driven from the shaft 10 when the latter is driven. The low speed forward drive, which may be referred to as first speed, is completed by engaging the clutch 15 and the brake 18. Power flows from the drive shaft 10 through the clutch 15 and the shaft 32 to the sun gear 19. The brake 18 holds the sun gear 23 against rotation so that the sun gear 23 functions as the reaction element of the planetary gearing system. The connected ring gears 20 and 24 are connected to the driven shaft 11 which is in turn connected to the rear road wheels (not shown). The ring gear 20 furnishes the initial resistance to be overcome so that it momentarily serves as a reaction element for the gearing system. Power flows from the sun gear 19 to the planet gears 21 thereby driving the gear carrier 22 and also flows through the planet gears 21 to the ring gear 20 tending to drive the ring gear 20 in a reverse direction. Power also flows from the carrier 22 to the dual planet gears 25 and 26 causing them to planetate about the sun gear 23 and to tend to drive the ring gear 24 of the gear set 13 in a forward direction. The torque exerted on the ring gear 24 is great enough to more than overcome the backward torque exerted on the ring gear 20 of the gear set 12. The net result is that the connected ring gears 20 and 24 and the driven shaft 11 connected thereto are driven at a reduced speed with respect to the drive shaft 10.

Intermediate speed forward drive through the transmission is completed by disengaging the clutch 15, engaging the clutch 14 and allowing the brake 18 to remain engaged. Power flows from the drive shaft 10 through the clutch 14 and the shaft 28 to the carrier 22. The brake 18 holds the sun gear 23 against rotation so that the sun gear 23 functions as the reaction element for the planetary gear set 13. As power flows to the carrier 22, the planet gears 26 are caused to planetate around the sun gear 23, and the planet gears 25 in mesh with the planet gears 26 are caused to drive the ring gear 24 and the driven shaft 11 connected thereto at a reduced speed with respect to the carrier 22 and the drive shaft 10. Only the gear set 13 is used to achieve this drive.

Direct speed forward drive through the transmission is completed by disengaging the brake 18, engaging the clutch 15 and allowing the clutch 14 to remain engaged. In this drive only the gear set 12 is utilized. With two of the elements of the gear set 12 rotating at the same speed namely, the sun gear 19 and the planet gear carrier 22, all the elements of the gear set 12 rotate as a unit at the speed of the drive shaft 10. Therefore, since the driven shaft 11 is connected to the ring gear 20 of the gear set 12 a direct drive exists between the drive shaft 10 and the driven shaft 11.

Overdrive speed forward drive through the transmission is completed by disengaging the clutch 15, engaging the brake 16 and allowing the clutch 14 to remain engaged. Here again only the planetary gear set 12 is utilized in transmitting a drive between the drive shaft 10 and the driven shaft 11. Power flows from the drive shaft 10 through the clutch 14 and the shaft 28 to the gear carrier 22. The brake 16 holds the sun gear 19 so that the sun gear 19 serves as a reaction element for the gear set 12. Power flows from the carrier 22 to the planet gears 21 causing them to planetate about the sun gear 19 and to drive the ring gear 20 and the driven shaft 11 connected thereto at an overdrive speed with respect to the carrier 22 and the drive shaft 10.

Reverse drive through the transmission is completed by engaging the clutch 15 and the brake 17. Here again only the gear set 12 is utilized. Power flows from the drive shaft 10 through the clutch 15 and the shaft 32 to the sun gear 19. The brake 17 holds the gear carrier 22 of the gear set 12 so that the carrier 22 functions as a reaction element for the gear set 12. Power flows from the sun gear 19 through the planet gears 21 to the ring gear 20 so that the ring gear 20 and the driven shaft 11 connected thereto are driven at a reduced speed with respect to the drive shaft 10 and in a reverse direction therefrom.

For the purposes of illustration only, a table is set forth below illustrating the speed ratios obtainable by the transmission with one particular size for each of the gears in the gear sets 12 and 13. The table also sets forth in tabular form the various brakes and clutches that are engaged to complete the various drives through the transmission.

| Speeds | C14 | C15 | B16 | B17 | B18 | Ratios |
| --- | --- | --- | --- | --- | --- | --- |
| 1st | | On | | | On | 3.262 to 1.000 |
| 2nd | On | | | | On | 1.727 to 1 |
| 3rd | On | On | | | | 1.000 to 1 |
| 4th | On | | On | | | .678 to 1 |
| Rev | | On | | On | | 2.111 to 1 |

The particular numerical ratios for the various drives through this transmission are obtained when the gears have the following number of teeth:

| | Teeth |
| --- | --- |
| Sun gear 19 | 27 |
| Ring gear 20 | 57 |
| Sun gear 23 | 24 |
| Ring gear 24 | 57 |

It will be understood that gears with other numbers of teeth may be used if desired to obtain other numerically different speed ratios all within the scope of the present invention.

This invention advantageously utilizes a simple planetary gear set and a dual planetary gear set interconnected to provide four forward speed drives and a drive in reverse. Another advantage of the invention is that only two friction devices need be engaged drives and a drive in reverse. Another advantage of the invention is that only two friction devices need be engaged at any one time to complete any of the desired speed ratios. Also in shifting from one speed ratio to another, either in an up-shift patern or a down-shift pattern only one new friction device need be engaged. Because all of the engaging devices are of the friction type, it is possible to gradually complete various drives through the transmission and as a result, have a smooth operation in shifting from one speed to another.

I wish it to be understood that my invention is not to be limited to the specific constructions and arrangements shown and described, except only insofar as the claims may be so limited, as it will be understood to those skilled in the art that changes may be made without departing from the principles of the invention. In particular, I wish it understood that the gear sizes may be varied as desired from those above mentioned to give a variety of numerical speed ratios.

What is claimed is:

1. In a transmission, the combination of a drive shaft, a driven shaft, a first planetary gear set and a second planetary gear set, said first gear set comprising a sun gear and a ring gear and a planet gear in mesh with the sun and ring gears and a planet gear carrier, said second gear set comprising a sun gear and a ring gear and a first planet gear in mesh with the sun gear and a second planet gear in mesh with the first planet gear and the ring gear and a planet gear carrier, a clutch for connecting said sun gear of said first gear set with said drive shaft, and a brake for holding said sun gear of said second gear set, said gear carrier of said first gear set being connected with said gear carrier of said second gear set, said ring gear of said first gear set and said ring gear of said second gear set and said driven shaft all being connected together, said clutch and said brake when both are engaged completing a low speed forward drive from said drive shaft to said driven shaft.

2. In a transmission, the combination of a drive shaft, a driven shaft, a first planetary gear set and a second planetary gear set, said first gear set comprising a sun gear element and a ring gear and a planet gear in mesh with the sun gear element and ring gear and a planet gear carrier element, said second gear set comprising a sun gear and a ring gear and a first planet gear in mesh with the sun gear and a second planet gear in mesh with the first planet gear and the ring gear and a planet gear carrier, a clutch for connecting one of said elements of said first gear set with said drive shaft, and a brake for holding said sun gear of said second gear set, said planet gear carrier element of said first gear set and said planet gear carrier of said second gear set being connected together, said ring gear of said first gear set and said ring gear of said second gear set and said driven shaft all being connected together, said clutch and said brake when both are engaged completing a change speed drive from said drive shaft to said driven shaft.

3. In a transmission, the combination of a drive shaft, a driven shaft, a first planetary gear set and a second planetary gear set, said first gear set comprising a sun gear and a ring gear and a planet gear in mesh with the sun and ring gears and a planet gear carrier, said second gear set comprising a sun gear and a ring gear and a first planet gear in mesh with the sun gear and a second planet gear in mesh with the first planet gear and the ring gear and a planet gear carrier, a clutch for connecting said gear carrier of said first gear set with said drive shaft, and a brake for holding one of said sun gears, said gear carrier of said first gear set being connected with said gear carrier of said second gear set, said ring gear of said first gear set and said ring gear of said second gear set and said driven shaft all being connected together, said clutch and said brake when both are engaged completing a change speed drive from said drive shaft to said driven shaft.

4. In a transmission, the combination of a drive shaft, a driven shaft, a first planetary gear set and a second planetary gear set, said first gear set comprising a sun gear and a ring gear and a planet gear in mesh with the sun and ring gears and a planet gear carrier, said second gear set comprising a sun gear element and a ring gear and a first planet gear in mesh with the sun gear element and a second planet gear in mesh with the first planet gear and the ring gear and a planet gear carrier element, a clutch for connecting said sun gear of said first gear set with said drive shaft, and a brake for holding one of said elements of said second gear set, said gear carrier of said first gear set being connected with said gear carrier element of said second gear set, said ring gear of said first gear set and said ring gear of said second gear set and said driven shaft all being connected together, said clutch and said brake when both are engaged completing a change speed drive from said drive shaft to said driven shaft.

5. In a transmission, the combination of a drive shaft, a driven shaft, a first planetary gear set and a second planetary gear set, said first gear set comprising a sun gear element and a ring gear and a planet gear in mesh with the sun gear element and the ring gear and a planet gear carrier element, said second gear set comprising a sun gear element and a ring gear and a first planet gear in mesh with the sun gear element and a second planet gear in mesh with the first planet gear and the ring gear and a planet gear carrier element, a clutch for connecting one of said elements of said first gear set with said drive shaft, and a brake for holding one of said elements of said second gear set, said gear carrier element of said first gear set being connected with said gear carrier element of said second gear set, said ring gear of said first gear set and said ring gear of said second gear set and said driven shaft being connected together, said clutch and said brake when both are engaged completing a change speed drive from said drive shaft to said driven shaft.

No references cited.